United States Patent
Wilhelmsson et al.

(10) Patent No.: US 10,492,143 B2
(45) Date of Patent: Nov. 26, 2019

(54) DETECTION AND OPERATION OF WAKE-UP RECEIVERS WITH LIMITED RANGE

(71) Applicant: Telefonaktiebolaget LM Ericsson (publ), Stockholm (SE)

(72) Inventors: Leif Wilhelmsson, Dalby (SE); Parth Amin, Hertfordshire (GB)

(73) Assignee: TELEFONAKTIELBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/367,181

(22) Filed: Mar. 27, 2019

(65) Prior Publication Data

US 2019/0223105 A1  Jul. 18, 2019

Related U.S. Application Data

(62) Division of application No. 15/493,450, filed on Apr. 21, 2017, now Pat. No. 10,271,282.

(51) Int. Cl.
*H04W 52/02* (2009.01)
*H04W 40/00* (2009.01)
*H04W 56/00* (2009.01)

(52) U.S. Cl.
CPC ..... *H04W 52/0241* (2013.01); *H04W 40/005* (2013.01); *H04W 52/0245* (2013.01); *H04W 56/0015* (2013.01)

(58) Field of Classification Search
CPC .......... H04W 52/0216; H04W 52/0241–0245; H04W 40/005; H04W 56/0015; H04W 84/12; Y02D 70/00; Y02D 70/1262; Y02D 70/142
See application file for complete search history.

(56) References Cited

U.S. PATENT DOCUMENTS

| | | |
|---|---|---|
| 6,580,700 B1 | 6/2003 | Pinard et al. |
| 9,872,252 B1 | 1/2018 | Ang et al. |
| 2004/0185820 A1 | 9/2004 | Ogura |
| 2009/0103456 A1 | 4/2009 | Herrmann et al. |
| 2010/0067421 A1 | 3/2010 | Gorokhov et al. |
| 2012/0282982 A1 | 11/2012 | Mujtaba et al. |

(Continued)

FOREIGN PATENT DOCUMENTS

WO  2014161912 A1  10/2014

OTHER PUBLICATIONS

Minyoung Park et al., Propoase for Wake-Up Receiver (WUR) Study Group, IEEE 802.11-16/0722r1, Intel Corporation, May 18, 2016, pp. 1-14.

(Continued)

*Primary Examiner* — Orlando Bousono
(74) *Attorney, Agent, or Firm* — Leffler Intellectual Property Law, PLLC; Kenneth B. Leffler

(57) ABSTRACT

A mobile device that comprises a main receiver and a wake-up receiver is operated by periodically attempting to receive a first signal that is configured for receipt by the wake-up receiver. For each attempt, a detection result is generated that indicates whether the first signal was received with a signal quality that satisfies a predetermined minimum quality criterion. One or more of the detection results are used as a basis for deciding whether or not the wake-up receiver is within range of an access point. An operation of the mobile device is adjusted in response to a decision that the wake-up receiver is not within range of the access point.

3 Claims, 9 Drawing Sheets

(56) References Cited

U.S. PATENT DOCUMENTS

| | | |
|---|---|---|
| 2014/0112226 A1 | 4/2014 | Jafarian et al. |
| 2014/0112229 A1 | 4/2014 | Merlin et al. |
| 2014/0120962 A1 | 5/2014 | Merlin et al. |
| 2016/0127995 A1 | 5/2016 | Merlin et al. |
| 2016/0150474 A1 | 5/2016 | Ang et al. |
| 2016/0183187 A1 | 6/2016 | Park |
| 2016/0255580 A1 | 9/2016 | Onaka et al. |
| 2016/0381638 A1 | 12/2016 | Min et al. |
| 2017/0026907 A1 | 1/2017 | Min et al. |
| 2017/0238255 A1 | 8/2017 | Chari et al. |
| 2017/0280392 A1 | 9/2017 | Segev et al. |

OTHER PUBLICATIONS

Wen-Chan Shih et al., A Long-Range Directional Wake-Up Radio for Wireless Mobile Networks, J. Sens. Actuator Netw. 2015, 4, Aug. 3, 2015, pp. 189-207.

PCT International Search Report, dated Jun. 25, 2018, in connection with International Application No. PCT/EP2018/057524, all pages.

PCT Written Opinion, dated Jun. 25, 2018, in connection with International Application No. PCT/EP2018/057524, all pages.

DETECTION AND OPERATION OF WAKE-UP RECEIVERS WITH LIMITED RANGE

CROSS-REFERENCE TO RELATED APPLICATIONS

This application claims the benefit of U.S. application Ser. No. 15/493,450 filed Apr. 21, 2017, which is hereby incorporated herein by reference in its entirety.

BACKGROUND

The present invention relates to mobile communications systems in which access points provide service to one or more mobile devices having a main receiver and a wake-up receiver, and more particularly to detecting when the wake-up receiver of a mobile device is not within range of a wake-up signal transmitted by the access point.

In mobile communications technology, the reduction of power consumption in various types of user equipment has long been a topic of interest and continues to be an important consideration in the design of next generation systems. The need to reduce power consumption is often very pronounced for devices targeting the Internet-of-Things (IoT), which can be considered an Internet-enabled connection of devices beyond those traditionally used for person-to-person communication. A large number of these IoT devices are expected to be powered by coin-cell batteries, which means that minimization of energy consumption is of utmost importance. In the future, such devices may be designed to harvest their own energy, and such a development would even further increase the importance of low energy consumption.

The supported data rates are typically low for these kind of applications, both with respect to peak data rates and aggregated data rates during, for example, an average day. This means that a major part of the power consumption is not related to transmitting or receiving data, but rather is expended when the devices are listening to the radiofrequency spectrum to determine whether there is a transmission for which it is the intended receiver.

As a result, a large part of the total energy consumption is due to the device's listening for a potential transmission that very often is not there, and this has motived the development of so-called wake-up receivers (WUR). A wake-up receiver is a device having extremely low power consumption and whose only purpose is to wake up another receiver, a so-called "main transceiver" (main receiver and transmitter), in the device. An IoT device with a wake-up receiver therefore conserves energy by not needing to turn on the main receiver to scan for a potential packet; it instead turns on the wake-up receiver. If in fact there is data for the IoT device, a wake-up signal (WUS) will be sent to the WUR. When the wake-up receiver has detected this WUS, and determined that there is data present it will then wake up the main receiver and transmitter, and a communication link can be established.

An Access Point (AP) may support a number of devices, or "stations" (STA), all having wake-up receiver capability, in which case it needs a way of directing the WUS to a particular wake-up receiver whenever there is data available for the STA containing that wake-up receiver. One way of doing this is by means of a Traffic Indication Map (TIM) element transmitted within a beacon transmission. In this arrangement, the AP enables one or more bits within the TIM element, where the particular bits enabled are those corresponding to the association identifier of the stations. If a bit is enabled, it indicates the availability of downlink data to the corresponding STA. This strategy helps a station to be in power save mode and to wake up for the beacon transmissions. If the AP indicates the availability of downlink data, the station may send the Power Save-Poll (PS-Poll) to get the downlink data.

For the stations that are not in power save mode, and have their transceivers always powered on, the AP may directly transmit the downlink data without requiring the polling process.

Initially, wake-up receiver technology was mainly the subject of academic research, but recently it has also been brought in for consideration in IEEE 802.11 standardization, with the wake-up radio study group being started. The intention is to have low power wake-up radios as a companion radio for the main 802.11 transceiver. The wake-up receiver wakes up the main 802.11 transceiver when a packet is available for reception, but the 802.11 main transceiver is switched off during the rest of the time. The use of a wake-up receiver enables energy efficient data reception without increasing latency. The wake-up signal transmitted by the access point to the specific station is intended as an indication that there is downlink data available for it to receive.

The wake-up receiver processes the WUSs carrying few bits of information. The wake-up receiver then wakes up the main receiver only if the identifier section of the wake-up signal matches with the expected bits. For example, Wen-Chan Shih et al., "A Long-Range Directional Wake-Up Radio for Wireless Mobile Networks", JOURNAL OF SENSOR AND ACTUATOR NETWORKS, 2015, ISSN 2224-2708 discloses a wake-up signal carrying 40 bits, out of which 16 bits represent station identifiers (STA-IDs) and 24 bits represent additional information.

Minyoung Park et al., "Proposal for Wake-Up Receiver (WUR) Study Group)", document: IEEE 802.11-16/0722r1, dated May 18, 2016 and available at https://mentor.ieee.org/802.11/dcn/16/11-16-0722-01-0000-proposal-for-wake-up-receiver-study-group.pptx discloses an 802.11 compatible wake-up packet design that, as illustrated in FIG. 1, includes:

Legacy 802.11 preamble (OFDM) consisting of a Legacy Short Training Field (L-STF), a Legacy Long Training Field (L-LTF), and a Legacy SIGNAL Field (L-SIG) thereby providing coexistence with the legacy STAs A new Wakeup signal waveform based on On-Off Keying (OOK) containing a Wakeup preamble, a Medium Access Control (MAC) header (receiver address), a Frame body, and a frame check sequence (FCS)

A station may inform an access point that it is wakeup receiver capable. Armed with this information, the access point may then use the wakeup signal to indicate the availability of downlink data to those one or more stations that indicated that they are wake-up capable. Upon receiving the wakeup signal, the wake-up receiver wakes up the 802.11 transceiver. The station may acknowledge the reception of WUS by transmitting a PS-Poll packet. The access point may transmit the corresponding downlink traffic on receiving the PS-Poll from the station.

There still remain problems with this technology that need to be addressed. For example, wake-up receivers are expected to be less power consuming compared to the 802.11 but this is achieved by making certain design tradeoffs, such as by designing receivers to have comparatively lower receiver sensitivity. This means that, although the wakeup signal may be transmitted at what are normally adequate signal levels for serving a main transceiver, the transmission range of the wakeup signal intended for wake-up receivers may be less than the legacy transmissions. This comparison is illustrated in FIG. 2, which shows five stations 201, 203, 205, 207, and 209, all served by an access point 211. As further illustrated, all of the stations 201, 203, 205, 207, and 209 are within range to engage in communication with the access point 211 using their main, 802.11 transceivers. But only three of the stations 201, 203, and 205, are within range to receive a wake-up signal from that same access point 211.

In this type of situation, the wake-up receiver can essentially be used for only a fraction of the coverage area of the actual data transmission. The usage of a wake-up receiver may still be beneficial because the wake-up receiver is often within range. However, since this is not always the situation, the STA may need to know whether the station is within the WUS transmission range of the access point or whether it is out of range.

In a related problem, the access point may also need to know which stations are within the transmission range of the WUS.

Hence there is a need for technology that addresses the above and/or related issues.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that operates a mobile device that comprises a main receiver and a wake-up receiver. The operation includes periodically attempting to receive a first signal (e.g., wake-up signal or synchronization signal) that is configured for receipt by the wake-up receiver. For each attempt, a detection result is generated that indicates whether the first signal was received with a signal quality that satisfies a predetermined minimum quality criterion. One or more of the detection results are used as a basis for deciding whether or not the wake-up receiver is within range of an access point. If the decision is that the wake-up receiver is not within range of the access point, then an operation of the mobile device is adjusted.

In some but not necessarily all embodiments consistent with the invention, adjusting the operation of the mobile device comprises operating the main receiver without reliance on wake-up receiver functionality.

In some but not necessarily all embodiments consistent with the invention, the predetermined minimum quality criterion is a failure to receive the first signal at or above a predetermined minimum quality level over a predetermined number of attempts. In some but not necessarily all alternative embodiments, the predetermined minimum quality criterion is a failure to receive the first signal at or above a predetermined minimum quality level for at least a predetermined number M out of a predetermined total number N of attempts.

In some but not necessarily all embodiments, periodically attempting to receive the first signal comprises periodically operating the main receiver to receive the first signal.

In some but not necessarily all embodiments, operation of the mobile device includes, in response to the decision that the wake-up receiver is not within range of the access point, sending to the access point an indication that the wake-up receiver is not within range of the access point. In some but not necessarily all such embodiments, in response to the decision that the wake-up receiver is not within range of the access point, an indication is sent to the access point, indicating that the access point should not use the first signal to initiate a transmission to the mobile device.

In some but not necessarily all embodiments, the first signal is dynamically configurable as one of a wake-up signal and a synchronization signal.

In other aspects of embodiments consistent with the invention, technology (e.g., methods, apparatuses, nontransitory computer readable storage media, program means) is provided that operates an access point that provides communication support for one or more mobile devices. The operation includes monitoring at least one channel to detect a presence of a signal from a mobile device. In response to detecting the presence of the signal from the mobile device, the signal is used to ascertain whether or not the mobile device is wake-up receiver capable. If the mobile device is wake-up receiver capable, operation further includes ascertaining whether or not the wake-up receiver is within range of the access point. In response to ascertaining that the mobile device is both wake-up receiver capable and within range of the access point, a wake-up signal is transmitted to a wake-up receiver of the mobile device when there is data available for transmission to the mobile device. In response to ascertaining that the mobile device is not both wake-up receiver capable and within range of the access point, an alternative transmission to the mobile device is used when there is data available for transmission to the mobile device, wherein the alternative transmission is configured for reception by a main receiver of the mobile device.

BRIEF DESCRIPTION OF THE DRAWINGS

The objects and advantages of the invention will be understood by reading the following detailed description in conjunction with the drawings in which.

DETAILED DESCRIPTION

Figure 1:
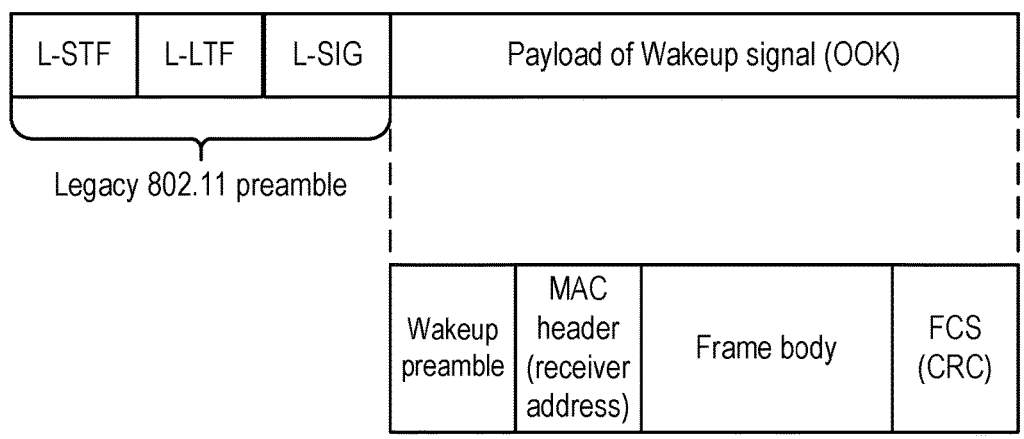
FIG. 1 illustrates an example of an 802.11 compatible wake-up packet design.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term station ("STA") is used. The STA herein can be any type of wireless device capable of communicating with a network node or access point by means of radio signals. The STA may also be a radio communication device, target device, device to device STA, machine type STA or STA capable of machine to machine communication, a sensor equipped with STA, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used, as well as the aforementioned "AP". These can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

An aspect of embodiments consistent with the invention is a mechanism by which a station having wake-up receiver capability is able to determine whether or not it is within range of a WUS transmitted by an access point that is supporting communications of the station.

In another aspect of some but not necessarily all embodiments consistent the invention, information about whether or not a station is within range of a WUS is provided to the supporting access point, and the access point is able to advantageously use this information to improve system performance whenever it has data to be sent to the station.

In yet another aspect of some but not necessarily all embodiments consistent with the invention, determining whether or not a station is within range of a WUS is based on detecting that one or more WUSs have not been received when expected.

In some alternative embodiments, determining whether or not a station is within range of a WUS is based on WUS quality measurements made by the main receiver of the station.

Figure 2:
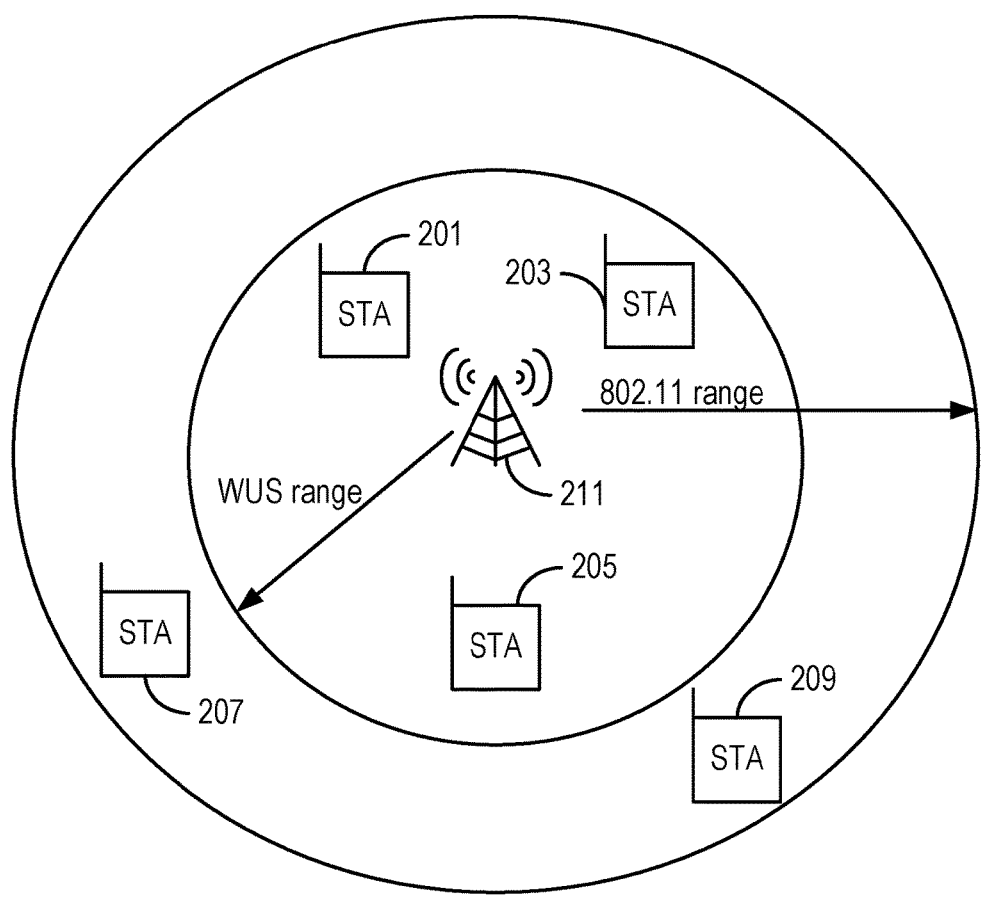
FIG. 2 illustrates differences in transmission range between an 802.11-compliant signal intended for typical 802.11 devices, and a wake-up signal intended for receipt by wake-up radios co-located with the 802.11 devices.

These and other aspects will now be discussed in further detail in the following. To facilitate the discussion, and without limitation, consider a situation such as, or similar to, the one depicted in FIG. 2, where the range of the WUS is smaller than the range of the 802.11 signal; hence, the coverage area for wake-up receivers is smaller than the coverage area of main transceivers. In this non-limiting example, five stations are depicted: STA 201, STA 203, STA 205, STA 207, and STA 209. If the AP 211 assumes that a station is within range for receiving the WUS when it actually is not, the AP 211 may keep transmitting WUSs configured for receipt by that station without obtaining any response to those transmissions. Similarly, if the station assumes it is within range of the WUS when it is not, it may make itself unreachable by putting its main transceiver into a sleep state, and then not turning on the main transceiver even when the AP is sending it WUSs.

In this and other embodiments presented herein, it is considered that the station has earlier established an association with the access point by means of its main transceiver. During this association, the access point and the station are also assumed to have exchanged information indicating that both are wake-up receiver capable; that is, that the access point is capable of transmitting a WUS and that the station has a wake-up receiver able to receive a WUS.

In the transmissions subsequent to this exchange of information about wake-up receiver capability, the access point may indicate the downlink data availability using WUS transmissions to the corresponding station.

Also in this and other embodiments presented herein, the access point periodically sends a signal configured for receipt by the wake-up receiver. This signal can be dynamically configured either as a (typically short) synchronization signal, or as a WUS. The WUS is sent only when the access point has something to send to the station, requiring that the main receiver be activated. Otherwise, the access point configures the signal as a synchronization signal. In the exemplary embodiments described herein, it is assumed that the WUS replaces the synchronization signal during the periodic transmission, although this is not an essential feature of embodiments consistent with the invention.

The term "periodic" is used herein to denote transmission at substantially regular intervals. In the exemplary embodiments described herein, the channel must be available (e.g., using a "listen before send" media access strategy) before any transmission can be made, and this may at times result in some delays in signal transmission. Notwithstanding any such delays, the transmission at substantially regular intervals is considered to be "periodic" as that term is used herein.

Furthermore, in this and other examples, an assumption is made that the signals are sent at the same power levels, although this is not an essential aspect of the embodiments consistent with the invention.

The duty cycle for the periodic transmissions may be, in some embodiments, uniform for all the stations served by an access point. But in alternative embodiments, a station may set its duty cycle individually (depending on reception quality and power level and consumption, etc.) and this duty cycle setting is signaled to the access point, which adjusts its operation so that WUSs are sent during windows of time during which it is known that the station's wake-up receiver is on.

Figure 3:
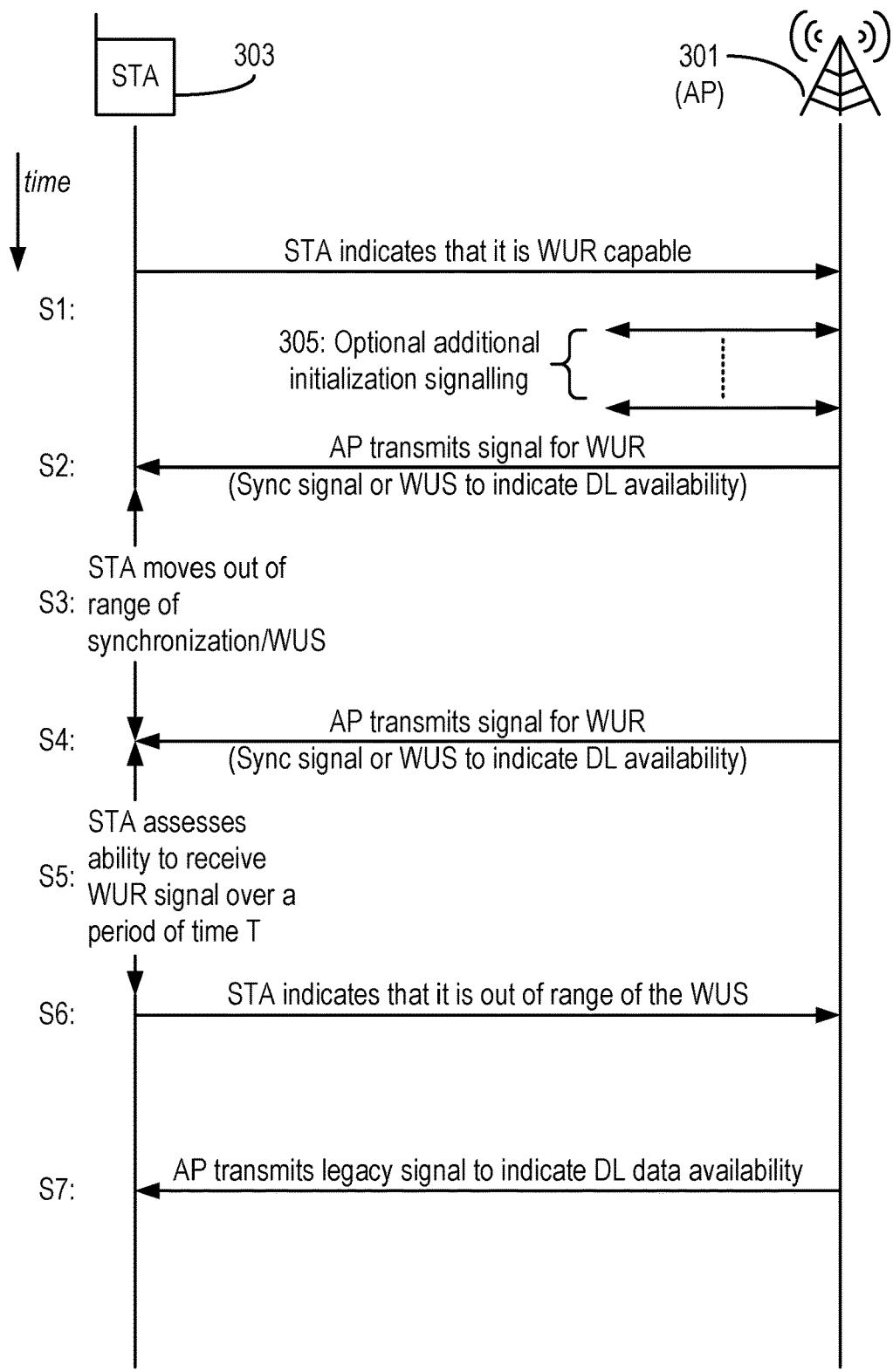
FIG. 3 illustrates signaling between, and some functionality of, an access point and a device having both a main transceiver and a wake-up receiver.

To illustrate some aspect of embodiments consistent with the invention, reference is made to FIG. 3, which illustrates signaling between, and some functionality of, an access point, AP 301 and a station, STA 303 having both a main transceiver and a wake-up receiver.

As shown in step S1, the STA 303 signals to the AP 301 that it is wake-up receiver capable (i.e., that it comprises a wake-up receiver as described above, in addition to a main transceiver). In some but not necessarily all embodiments, there may be additional initialization signaling, represented in FIG. 3 by signaling 305. For example, the AP 301 may, in response to the STA 303 indicating that it is wake-up receiver capable, respond by informing the STA 303 that it adjust its operation to cause a WUS to be sent if it has downlink (DL) data to send to the STA 303. Furthermore, as there may be significant time before any DL data becomes available, the AP 301 may also inform the STA 303 that it will send wake-up signals or other types of synchronization signals at pre-defined intervals, these being for the purpose of allowing the STA 303 to use its wake-up receiver to synchronize itself without the need to activate its main transceiver. The AP 301 then does send one or more of these signals, as represented by step S2.

The STA 303 uses these signals to synchronize itself, and in case the wake-up receiver is duty-cycled (i.e., it actively receives for only part of the time), these periodic signals are also used to compensate for time-drift that may potentially occur when the wake-up receiver is in its off state.

To further illustrate aspects of these embodiments, it will be assumed that the STA 303 at some point moves beyond the range of the WUS (step S3), but does not know this. At some point later, the AP 301 sends a next period signal for the wake-up receiver (step S4), but because the STA 303 is out-of-range, the signal is not received by the STA 303. The STA 303 nonetheless listens for the signal for some amount of time, denoted T.

Detecting that the STA 303 is out-of-range can be achieved in a number of alternative ways. In one alternative, the STA assesses its ability to receive synchronization/WUS signals over the period of time, T (step S5). Using this information, the STA 303 can decide that it is out of range based on detecting that the number of missed synchronization/WUSs during the time T is too high. And here too, there are a number of alternatives. For example, deciding that too many signals have been missed may mean missing more than some predefined number, N (e.g., N=3) of consecutive signals. As another alternative, a decision that the STA 303 is out-of-range may be made based on detecting that some predetermined number, M, out of the latest N synchronization/WUS signals were not received, where M and N are both positive integers (e.g., M=7 and N=10).

In response to detecting that it is out-of-range of the WUR signals, the STA 303 signals to the AP 301 that it is out-of-range (step S6). In response, the AP 301 adjusts its operation accordingly, so as not to rely on the STA's wake-up receiver functionality. For example, the AP 301 may transmit a conventional (legacy) signal (e.g., configured for receipt by the STA's main transceiver) to indicate to the STA 303 that it has data available for downlink transmission to the STA 303 (step S7).

Further aspects of embodiments consistent with the invention will now be described with reference to FIG. 4, which depicts, in one respect, a flow chart of steps/processes performed by a wake-up receiver-capable mobile device in accordance with some but not necessarily all exemplary embodiments consistent with the invention. In another respect, FIG. 4 also depicts an arrangement of various circuitry configured to perform the actions as set out in the figure, and as further described herein, such circuitry being comprised in a wake-up receiver-capable mobile device (station).

The aim of the depicted process is to decide whether a mobile device's wake-up receiver is within range of an access point's transmitted signal configured for receipt by the wake-up receiver (hereinafter, "WUR signal"). The exemplary process is configured as a loop that is repeated with each attempt to receive the WUR signal, with each loop performance being, for example, consecutively numbered, herein denoted generally by i (where i is an integer). At an initial portion of the loop, the mobile device makes an $i^{th}$ attempt to receive the WUR signal (step 401).

Attempting to receiving the WUR signal as shown in step 401 can be performed in a number of different ways. In some but not necessarily all embodiments, these attempts are made by the wake-up receiver. Such attempts may be successful or not, and those results can be used in subsequent steps, as will be described.

In alternative embodiments, the attempts to receive the WUR signal are made by the mobile device's main receiver, rather than by the wake-up receiver. In still other alternatives, the attempts to receive the WUR signal are made by the mobile device's main receiver and also by the wake-up receiver. Use of the main receiver for this purpose is preferably limited to instances in which the wake-up receiver has missed some number of WUR signals. Such embodiments have the benefit of being able to utilize the main receiver's better sensitivity, compared to that of the wake-up receiver. With this better sensitivity, the range of the WUR signal is effectively made at least as large as the range of the "normal" data communications (assuming comparable transmission power is applied to each). When receiving the WUR signal by the main receiver, the signal quality of the WUR signal is determined. The mobile device should be configured to know the sensitivity of the wake-up receiver, and with this information it is straightforward for the mobile device to determine, based on the signal quality obtained by the main receiver, whether the wake-up receiver would have been able to detect the WUR signal.

As an example, suppose that the sensitivity of the wake-up receiver is −80 dBm, whereas the sensitivity of the main receiver is −100 dBm. Upon reception of the WUR signal by the main radio (which is possible as long as the received power is above −100 dBm), the signal power can be estimated. If the estimated power is below −80 dBm it is determined that the wake-up receiver is out of coverage, whereas if it is above −80 dBm it is within coverage.

To describe these exemplary embodiments further, the main receiver is used during normal operation to determine whether the wake-up receiver is within range of the WUR signals. When this is the case, the main receiver can be permitted to be put into a sleep mode, with the wake-up receiver be used to reawaken the main receiver when data is available. If the station moves out-of-range of the WUR signal while the main receiver is in sleep mode, the wake-up receiver will start to miss some of the WUR signals (e.g., it will miss the periodically transmitted synchronization signals). The wake-up receiver will respond to detecting that it has missed WUR signals by turning on the main receiver to receive the WUR signals.

Since the main receiver has better sensitivity than the wake-up receiver, it will likely be successful in its reception attempts, and it can then also determine the quality of the signal.

In those instances in which the wake-up receiver is out of range to begin with (e.g., when the device is first turned on), it will simply not be used at all, and the main receiver will perform all necessary functions to monitor for the WUR signal and activate informing the access point that the mobile device is out-of-range.

Figure 4:
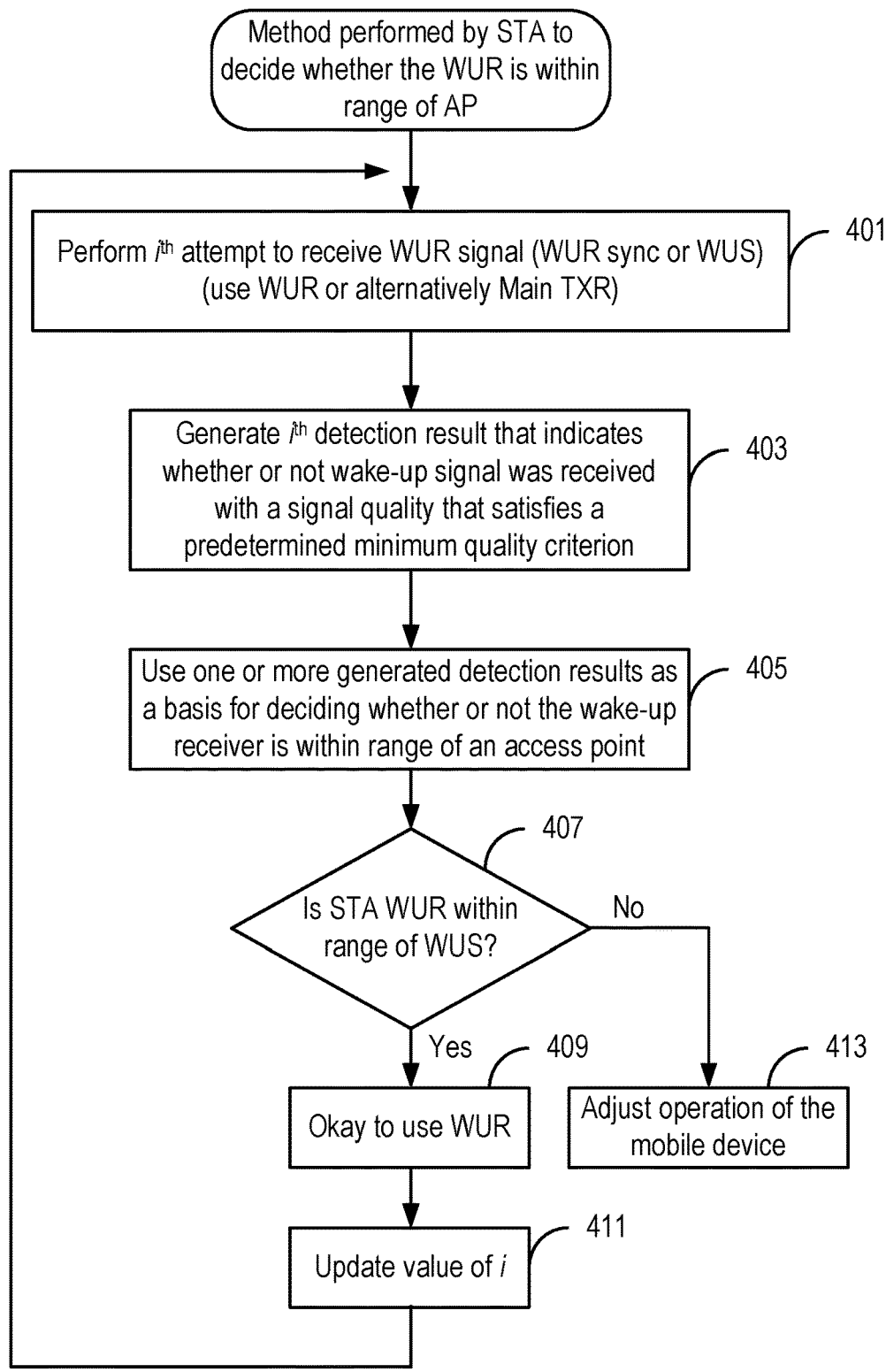
FIG. 4 depicts, in one respect, a flow chart of steps/processes performed by a wake-up receiver-capable mobile device in accordance with some but not necessarily all exemplary embodiments consistent with the invention.

Continuing with further steps shown in FIG. 4, based on this attempt, an $i^{th}$ detection result is produced that indicates whether or not the WUR signal was received with a signal quality that satisfies a predetermined minimum quality criterion (step 403).

One or more detection results (e.g., some non-zero number, K, of the most recent detection results) are used as a basis for deciding whether or not the wake-up receiver is within range of an access point (step 405). As mentioned earlier, this can for example comprise detecting that more than some predefined number, N of consecutive signals have been missed. As another non-limiting example, deciding whether or not the wake-up receiver is within range of the access point can comprise detecting that some predetermined number, M, out of the latest N WUR signals were not received, where M and N are both positive integers.

Subsequent steps are conditionally performed based on what decision was made. If the decision is that the mobile device's wake-up receiver is within range of the WUR signal ("Yes" path out of decision block 407), then operation is configured to utilize the wake-up receiver to wake-up the main receiver when there is data to be received from the access point (step 409). The loop counter, i, is incremented (step 411), and execution reverts back to step 401.

But if the decision is that the mobile device's wake-up receiver is not within range of the WUR signal ("No" path out of decision block 407), then operation is configured to adjust an operation of the mobile device. In some but not necessarily all embodiments, adjusting the operation of the mobile device comprises operating the main receiver without reliance on wake-up receiver functionality. In some but not necessarily all embodiments, adjusting the operation of the mobile device comprises sending an indication to the access point, informing that the wake-up receiver is not within range of the access point, so that the access point will know that it should not rely on the wake-up receiver when trying to initiate a transmission to this mobile device. In some embodiments, the access point responds by using a legacy transmission instead of a WUS when data is available for download to this mobile device. (See, e.g., step S7 in FIG. 3, described earlier.)

Figure 5:
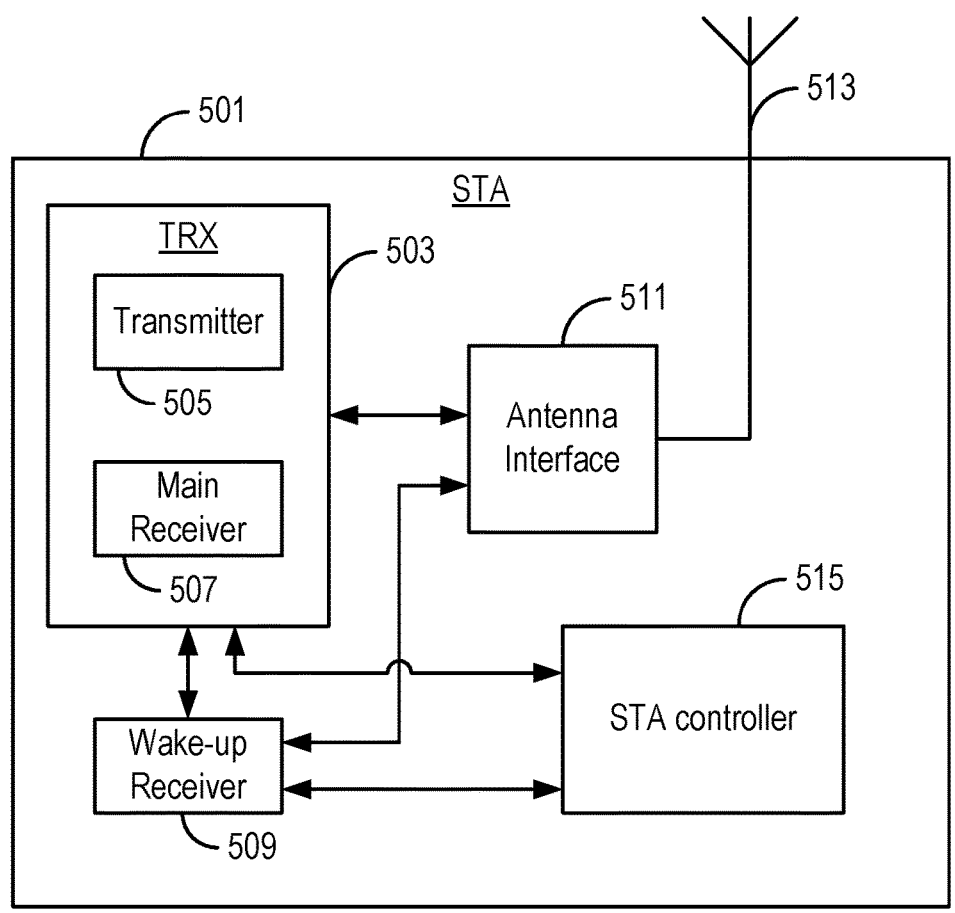
FIG. 5 illustrates some elements (e.g., circuitry) of a wake-up receiver-capable mobile device in accordance with some but not necessarily all exemplary embodiments consistent with the invention.

Looking at further aspects of embodiments consistent with the invention, FIG. 5 is a block diagram of elements for carrying out various aspects of the invention as described above, such as in connection with FIGS. 2, 3, and 4. In particular, a station 501 includes a transceiver (TRX) 503 comprising a transmitter 505 and a main receiver 507. In order to allow the main receiver 507 to enter a power saving state when not required to receive signals, the station 501 also includes a wake-up receiver 509 as described above. The wake-up receiver 509 is operatively coupled to the transceiver 503.

An antenna interface 511 is also provided that enables the transceiver 503 and the wake-up receiver 509 to access a common antenna 513. In other configurations, each receiver could have its own antenna.

Control of the various elements, as well as decision making regarding whether the station 501 is out-of-range of the WUR signal, are performed by a station controller 515, which sends and receives associated control and other informational signals between itself and the other components.

Figure 6:
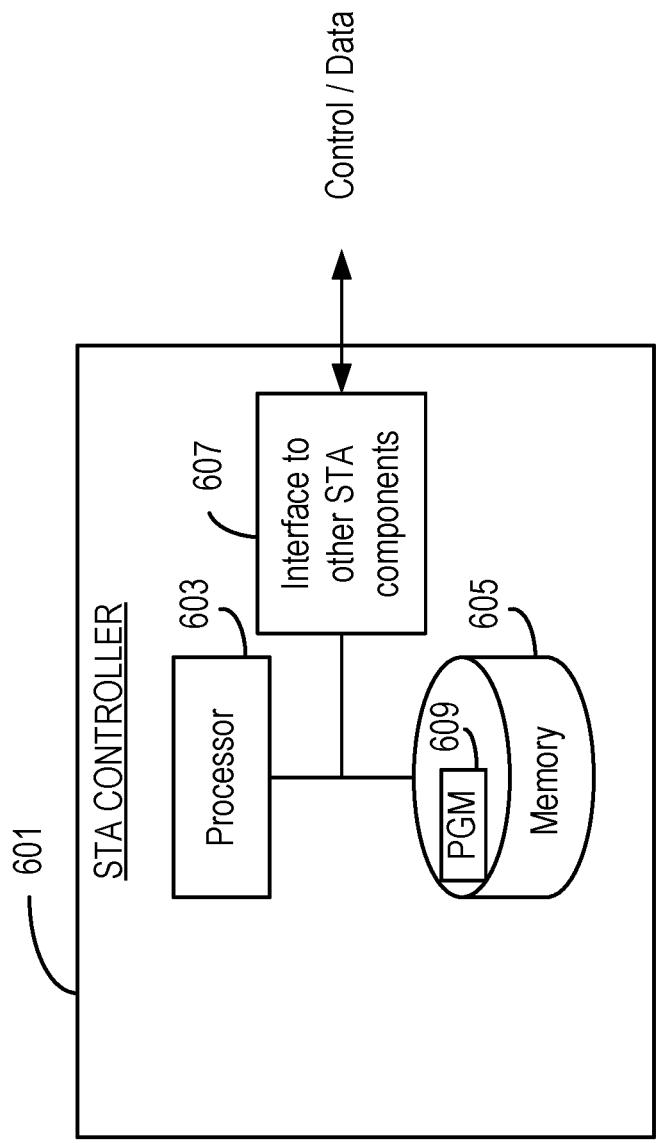
FIG. 6 illustrates an exemplary controller of a wake-up receiver-capable mobile device, in accordance with some but not necessarily all exemplary embodiments consistent with the invention.

Other aspects of an exemplary station 501 are shown in FIG. 6, which illustrates an exemplary controller 601 of a wake-up receiver-capable mobile device/station, in accordance with some but not necessarily all exemplary embodiments consistent with the invention. In particular, the controller includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 6, however, is programmable circuitry, comprising a processor 603 coupled to one or more memory devices 605 (e.g., Random Access Memory, Magnetic Disc Drives, Optical Disk Drives, Read Only Memory, etc.) and to an interface 607 that enables bidirectional communication with other elements of the station (see, e.g., the station 501 of FIG. 5). The memory device(s) 605 store program means 609 (e.g., a set of processor instructions) configured to cause the processor 603 to control other station elements so as to carry out any of the aspects described above, such as but not limited to those described with reference to FIGS. 2, 3, and 4. The memory device(s) 605 may also store data (not shown) representing various constant and variable parameters as may be needed by the processor 603 and/or as may be generated when carrying out its functions such as those specified by the program means 609.

Figure 7:
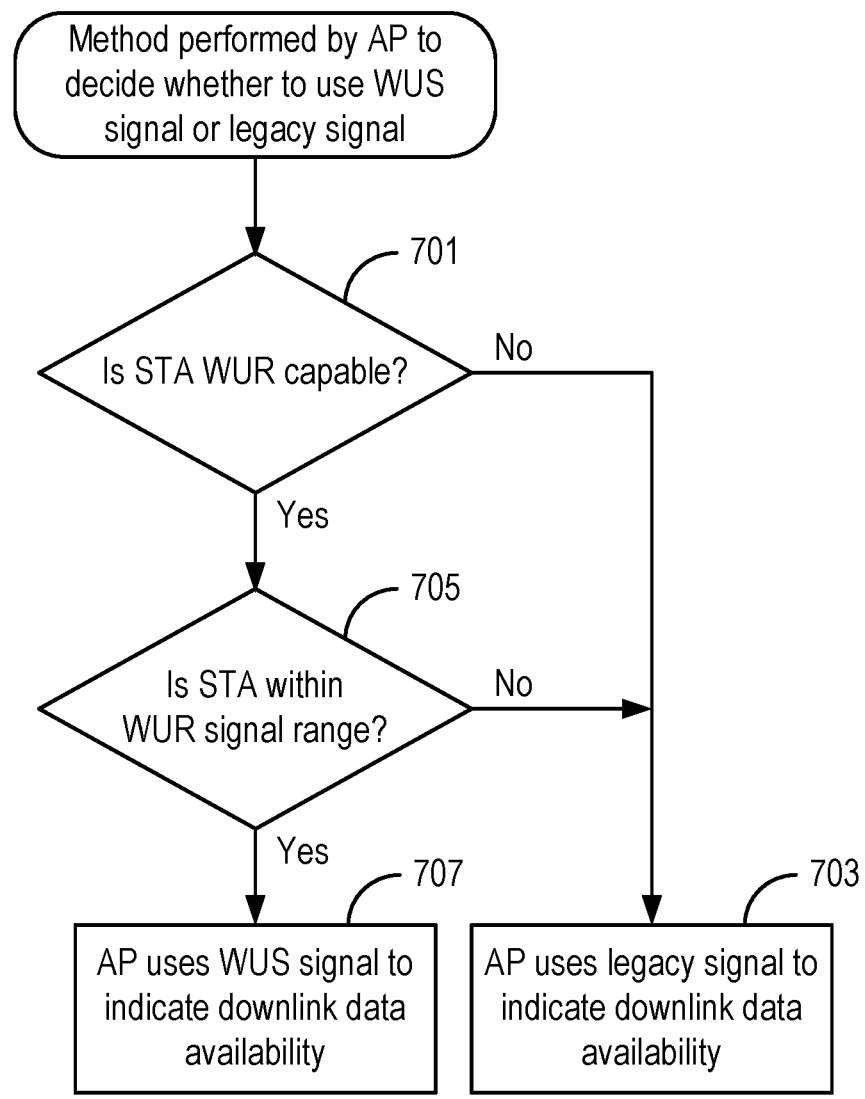
FIG. 7 depicts, in one respect, a flow chart of steps/processes performed by an access point in accordance with some but not necessarily all exemplary embodiments consistent with the invention.

Further aspects of some but not necessarily all embodiments consistent with the invention will now be described with reference to FIG. 7, which depicts, in one respect, a flow chart of steps/processes performed by an access point in accordance with some but not necessarily all exemplary embodiments consistent with the invention. In other respects, FIG. 7 also depicts an arrangement of various circuitry configured to perform the actions as set out in the figure, and as further described herein, such circuitry being comprised in an access point configured to operate with a wake-up receiver-capable mobile device (station) that is consistent with embodiments described herein.

As will be appreciated from the earlier discussion, an access point may need to deal effectively with a set of stations, wherein some of the stations are within the WUR signal coverage area, and others are not. Accordingly, in an exemplary embodiment, an access point uses initial signaling (described earlier) to ascertain whether a given station is wake-up receiver capable. If not ("No" path out of decision block 701), the access point will exclusively use legacy signals to indicate downlink data availability (step 703).

But if the station is wake-receiver capable ("Yes" path out of decision block 701), then a decision of how to operate is based on whether or not the station is within the WUR signal coverage area. As described earlier, this information can be signaled from the station itself. (See, e.g., step S6 in FIG. 3.) If the station is within WUR signal range ("Yes" path out of decision block 705), then the access point will transmit a wake-up signal to a wake-up receiver of the station when there is data available for transmission to the mobile device (step 707).

But if the station is not within WUR signal range ("No" path out of decision block 705), the wake-up receiver will not be able to respond to a WUR signal. Accordingly, the access point uses an alternative transmission to the station (e.g., legacy signaling) when there is data available for transmission to the station, wherein the alternative transmission is configured for reception by a main receiver of the mobile device.

Figure 8:
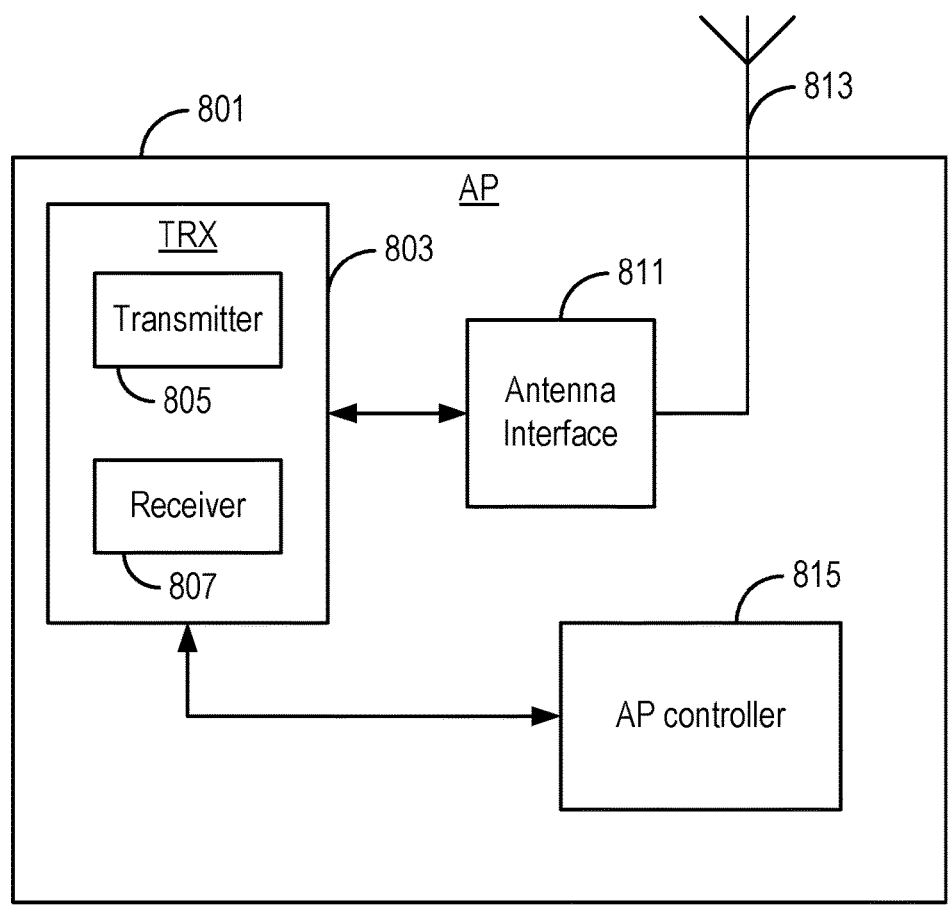
FIG. 8 illustrates some elements (e.g., circuitry) of an access point, in accordance with some but not necessarily all exemplary embodiments consistent with the invention.

Looking at further aspects of embodiments consistent with the invention, FIG. 8 illustrates some elements (e.g., circuitry) of an access point for carrying out various aspects of the invention as described above, such as in connection with FIGS. 2, 3, and 4. In particular, an access point 801 includes a transceiver (TRX) 803 comprising a transmitter 805 and a receiver 807.

The transceiver 803 is coupled to an antenna 813 to enable the sending and receiving of signals.

Control of the various elements, as well as functionality associated with the various stations' wake-up radio capability, are performed by an access point controller 815, which sends and receives associated control and other informational signals between itself and the other components.

Figure 9:
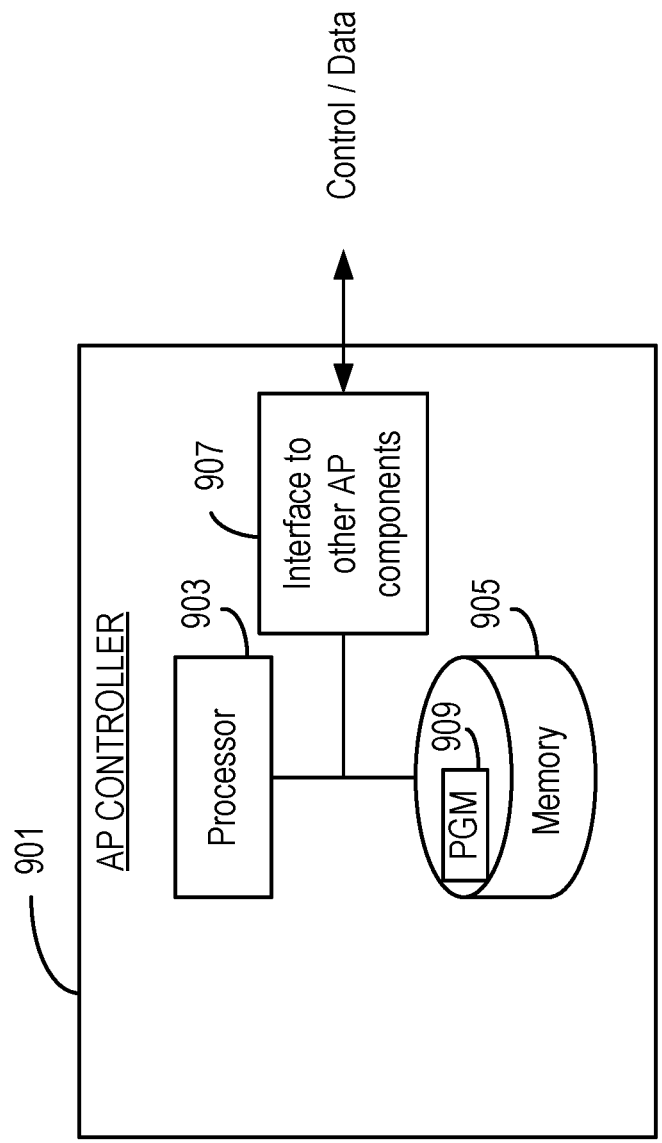
FIG. 9 illustrates an exemplary controller of an access point, in accordance with some but not necessarily all exemplary embodiments consistent with the invention.

Other aspects of an exemplary access point 801 are shown in FIG. 9, which illustrates an exemplary controller 901 of an access point in accordance with some but not necessarily all exemplary embodiments consistent with the invention. In particular, the controller 901 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 9, however, is programmable circuitry, comprising a processor 903 coupled to one or more memory devices 905 (e.g., Random Access Memory, Magnetic Disc Drives, Optical Disk Drives, Read Only Memory, etc.) and to an interface 907 that enables bidirectional communication with other elements of the access point (see, e.g., the access point 801 of FIG. 8). The memory device(s) 905 store program means 909 (e.g., a set of processor instructions) configured to cause the processor 903 to control other access point elements so as to carry out any of the aspects described above, such as but not limited to those described with reference to FIGS. 2, 3, and 4. The memory device(s) 905 may also store data (not shown) representing various constant and variable parameters as may be needed by the processor 903 and/or as may be generated when carrying out its functions such as those specified by the program means 909.

The various embodiments provide a number of advantages over earlier technology. For example, aspects of exemplary embodiments enable efficient use of WURs even in situations in which the coverage area for the WUR is less than coverage area for the main transceiver. This, in turn, allows for reduced power consumption as it increases applicability of very simple WURs.

In addition, knowledge about whether a given STA is within range of a WUS is, in some embodiments, provided to the AP. The AP can beneficially use this information to more effectively use wake-up signals only for the STAs that are within range of the WUS.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of operating an access point that provides communication support for one or more mobile devices, the method comprising:

monitoring at least one channel to detect a presence of a signal from a mobile device;

in response to detecting the presence of the signal from the mobile device, using the signal to ascertain whether or not the mobile device is wake-up receiver capable, and if the mobile device is wake-up receiver capable, ascertaining whether or not the wake-up receiver is within range of the access point;

in response to ascertaining that the mobile device is both wake-up receiver capable and within range of the access point, transmitting a wake-up signal to a wake-up receiver of the mobile device when there is data available for transmission to the mobile device; and in response to ascertaining that the mobile device is not both wake-up receiver capable and within range of the access point, using an alternative transmission to the mobile device when there is data available for transmission to the mobile device, wherein the alternative transmission is configured for reception by a main receiver of the mobile device.

2. A controller for an access point that provides communication support for one or more mobile devices, the controller comprising:

circuitry configured to monitor at least one channel to detect a presence of a signal from a mobile device;

circuitry configured to respond to a detected presence of the signal from the mobile device, by using the signal to ascertain whether or not the mobile device is wake-up receiver capable, and if the mobile device is wake-up receiver capable, ascertaining whether or not the wake-up receiver is within range of the access point;

circuitry configured to respond to ascertaining that the mobile device is both wake-up receiver capable and within range of the access point, by transmitting a wake-up signal to a wake-up receiver of the mobile device when there is data available for transmission to the mobile device; and circuitry configured to respond to ascertaining that the mobile device is not both wake-up receiver capable and within range of the access point, by using an alternative transmission to the mobile device when there is data available for transmission to the mobile device, wherein the alternative transmission is configured for reception by a main receiver of the mobile device.

3. A nontransitory computer readable storage medium comprising program code that, when executed by one or more processors of an access point, cause the access point to perform a method, wherein the access point provides communication support for one or more mobile devices, and wherein the method comprises:

monitoring at least one channel to detect a presence of a signal from a mobile device;

in response to detecting the presence of the signal from the mobile device, using the signal to ascertain whether or not the mobile device is wake-up receiver capable, and if the mobile device is wake-up receiver capable, to ascertain whether or not the wake-up receiver is within range of the access point;

in response to ascertaining that the mobile device is both wake-up receiver capable and within range of the access point, transmitting a wake-up signal to a wake-up receiver of the mobile device when there is data available for transmission to the mobile device; and in response to ascertaining that the mobile device is not both wake-up receiver capable and within range of the access point, using an alternative transmission to the mobile device when there is data available for transmission to the mobile device, wherein the alternative transmission is configured for reception by a main receiver of the mobile device.

* * * * *